April 10, 1951 S. C. MAJOR 2,548,034
ELECTRICAL KITCHEN APPLIANCE
Filed Feb. 17, 1948 2 Sheets-Sheet 1

Stephen C. Major
INVENTOR.

BY *Clarence A. O'Brien
and Harvey B. Jacobson*
Attorneys

April 10, 1951 S. C. MAJOR 2,548,034
ELECTRICAL KITCHEN APPLIANCE
Filed Feb. 17, 1948 2 Sheets-Sheet 2
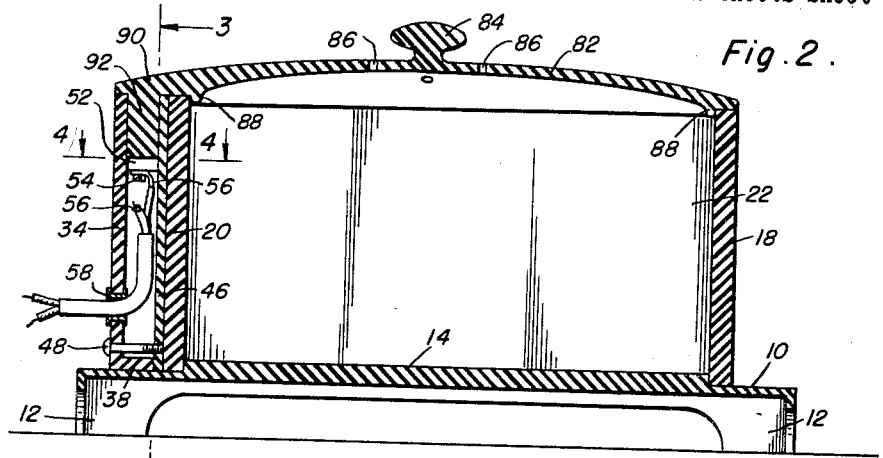
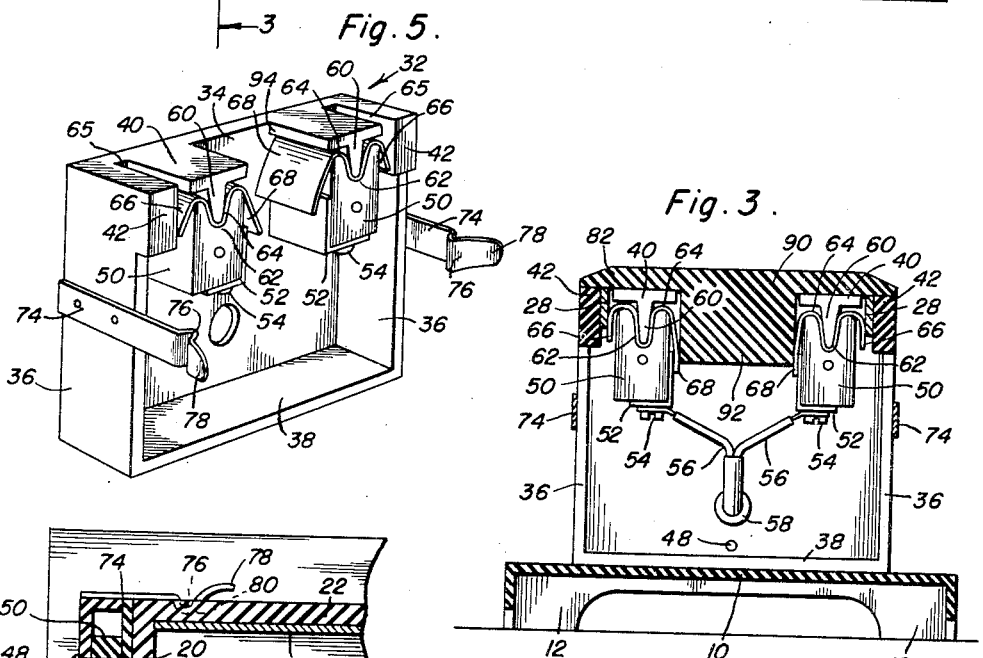
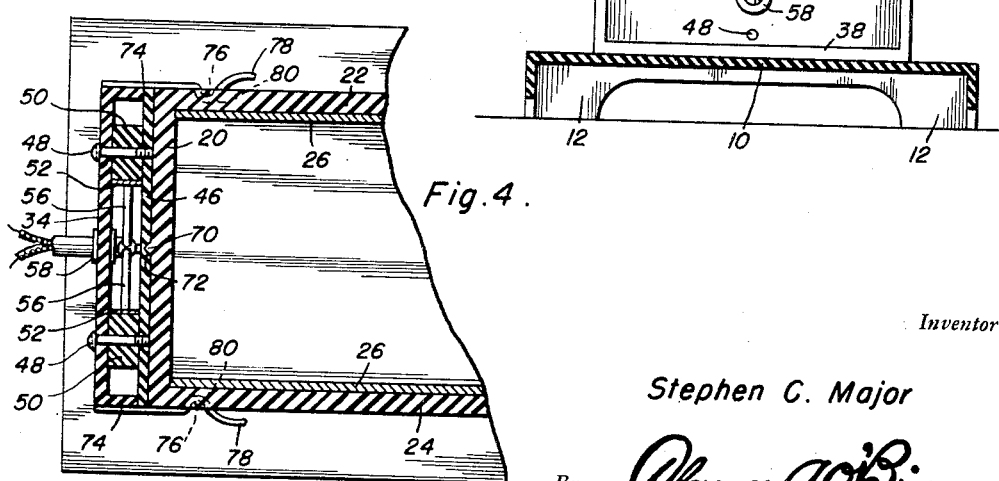
Inventor
Stephen C. Major Patented Apr. 10, 1951

2,548,034

UNITED STATES PATENT OFFICE 2,548,034

ELECTRICAL KITCHEN APPLIANCE

Stephen C. Major, Woodstock, N. Y.

Application February 17, 1948, Serial No. 8,842

8 Claims. (Cl. 219—35)

This invention relates to new and useful improvements in electric cookers and the primary object of the present invention is to provide an electrical kitchen appliance for baking cakes, breads and similar products made of dough in a convenient and sanitary manner.

Another important object of the present invention is to provide an electrical kitchen appliance including a plurality of electrical contact units and embodying novel and improved means for quickly and readily actuating and deactuating the contact units.

Another object of the present invention is to produce an electrical kitchen appliance that will provide a quicker method for baking cakes and breads, reducing baking time from approximately thirty to fifty minutes, to approximately twelve to twenty minutes; eliminates necessity to preheat ovens to a high baking temperature; provides inexpensive method for home baking, using approximately the power consumed by a 100-watt bulb; eliminates excess heat in kitchen attendant with oven baking; eliminates use of baking pans and tins; eliminates the necessity of having to grease and flour utensils prior to baking; eliminates burned or scorched results from having batter in oven too long; assures 100% results and uniformity in cake baking; permits inexperienced cooks to have satisfactory results immediately, without failures; and which is ideally suited for prepared-mix recipes.

Another object of the present invention is to provide an electrical kitchen appliance so constructed that all parts with the exception of end plug may be removed and immersed in water for cleaning.

Another object of the present invention is to provide an electrical kitchen appliance including a plurality of electrode plates between which current is passed to treat or bake batter therebetween.

Another object of the present invention is to provide an electrical kitchen appliance including a novel and improved or automatic switch means that will retain the electrical circuit de-energized until such time as the cover is in place whereby the circuit will be closed.

A further object of the present invention is to provide an electrical kitchen appliance including a baking chamber, a plurality of baking units, and novel and improved closure means which will close a circuit to actuate the heating units when applied in a closed position to the chamber, and which will open a circuit to deactuate the baking units when the closure is removed from the chamber so that should the closure be accidentally removed from the baking chamber, danger from contact with electrical current is eliminated.

A still further aim of the present invention is to provide an electrical kitchen appliance that is simple and practical in construction, small and compact in structure, strong and reliable in use, neat and attractive in appearance, relatively inexpensive to manufacture, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 2 is a longitudinal vertical sectional view taken substantially through the center of the present baking appliance;

Figure 3 is a transverse vertical sectional view taken substantially on the plane of section line 3—3 of Figure 2;

Figure 4 is a fragmentary horizontal sectional view taken substantially on the plane of section line 4—4 of Figure 2; and, Figure 5 is a perspective view of contact housing used in conjunction with the present invention, and showing the contact units applied thereto.

Figure 1:
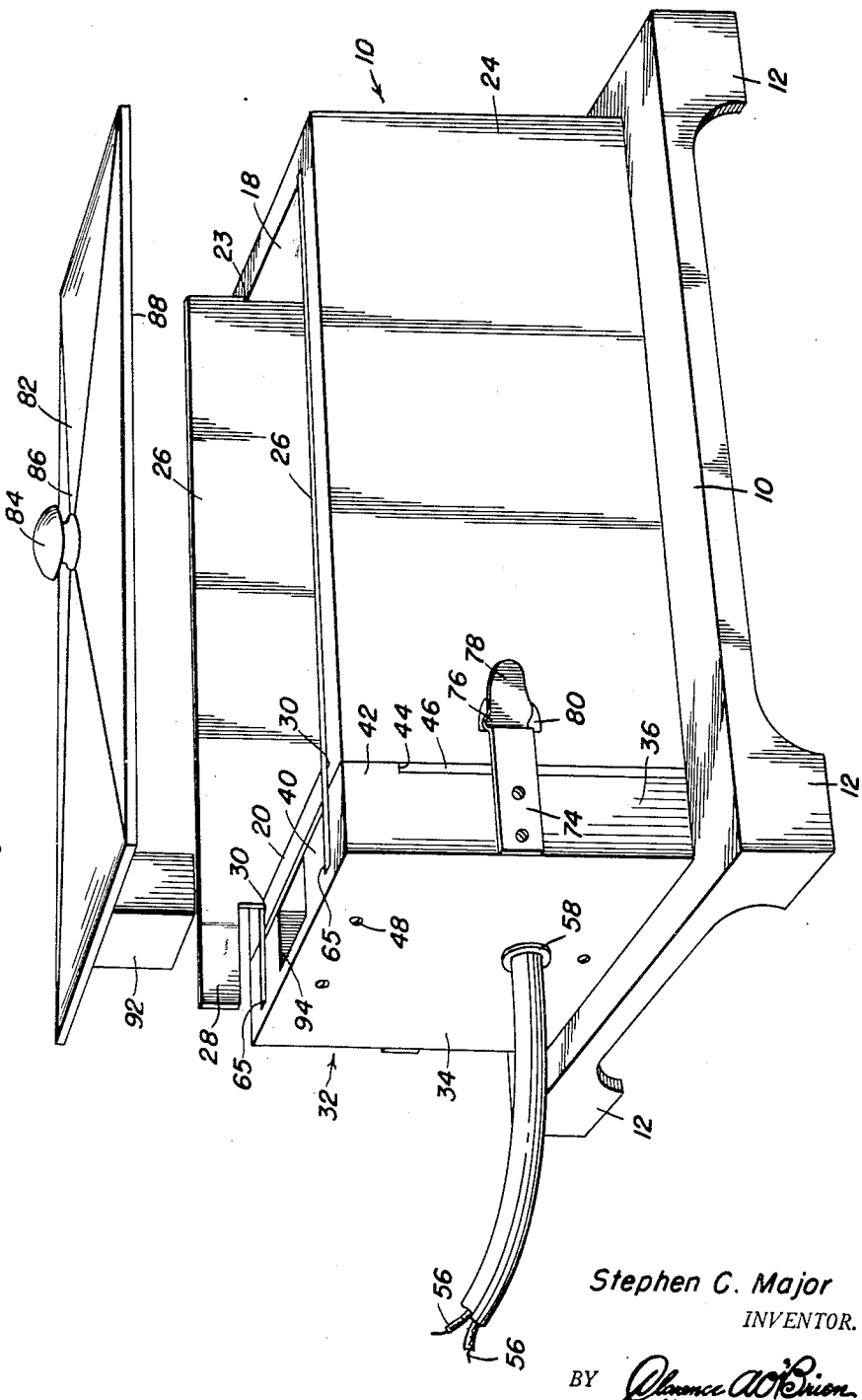
Figure 1 is a perspective view of the present invention, and showing the closure in an open position and one of the electrode plates in a partially extended position.

Referring now to the drawings in detail, wherein for the purpose of illustration, there is disclosed a preferred embodiment of the present invention, the numeral 10 represents a base member or plate having integral leg portions 12 for supporting the base member in an elevated position. Integrally formed with the base member 10, is an upstanding, integral central portion 14 that frictionally engages the open lower end of a substantially rectangular baking chamber 16 having spaced end walls 18 and 20 and spaced side walls 22 and 24.

Slidably engaging vertical slots or grooves 23 provided in one of the end walls for example end wall 18, adjacent the side walls 22 and 24, is a pair of electrode plates 26 having integral projections 28 or extensions 28 that frictionally engage notches 30 in the end wall 20.

The numeral 32 represents the contact housing used in conjunction with present invention generally, comprising an outer wall 34, a pair of side walls 36, a lower wall 38, and an upper wall 40. The side walls 36 are provided with integral projections 42 that frictionally engage notches 44 in the upper corners of an inner wall 46 that is removably secured to the outer wall 34 by fasteners or the like 48.

Removably secured to the inner face of the outer wall 34, is a pair of mounting blocks 50 which support angular conductive, fixed contact plates 52. These plates 52 are secured to blocks 50 by fasteners 54 that are connected to the ends of a pair of circuit wires 56 which extend through a resilient sleeve 58 carried by the outer wall 34. Depending from the upper wall 40 is a pair of retaining lugs 60 that loosely engage substantially V-shaped grooves 62 provided in the upper portions of the mounting blocks 50. Frictionally engaging the upper portions of the mounting blocks 50, is a pair of inverted substantially W-shaped conductive plates 64 the outer legs of which frictionally engage the extensions 28 of the electrode plates 26 that engage slots 66 provided in the upper wall 40 and the opposite leg portions 68 of these conductive plates 64 are elongated and normally oppose and are spaced from the contact plates 52.

In order to guide and position the contact housing 32 relative to the end wall 20, there is provided a vertical substantially V-shaped tongue 70 on the outer face of the end wall 20 that frictionally engages a vertical groove 72 in the inner wall 46. Fixed to the side walls 36 of the contact housing 32, is a pair of resilient straps 74 having loops 76 formed adjacent their free ends 78 that frictionally engage recesses 80 provided in the side walls 22 and 24 to retain the contact housing 32 relative to the end wall 20.

The numeral 82 represents a closure of nonconductive material having an integral knob 84 at its central portion and a plurality of pressure relief openings 86. Integrally formed with the lower periphery of the closure 82, is a depending substantially rectangular flange 88 that frictionally engages the open upper end of the baking chamber 16. This closure 82 is provided with an integral end portion 90 that overlies the upper wall 40 of the housing 32 and which is provided with a downwardly extending spreader block 92 that slidably engages a central opening 94 provided in the upper wall 40 of the housing 32 and which frictionally engages the leg portions 68 of the contact plates 64 for urging the same into circuit closing positions with the conductive plates 52.

In practical use of the present invention, the wires 56 are connected to a usual plug (not shown) which is inserted into a conventional electric socket. When the closure 82 is applied to the chamber 16, the block 92 will force the leg portions 68 of the conductive plates 64 into engagement with the contact plates 52 to close the circuit, energizing the electrodes 26, thereby passing electric current through the dough mass to be baked and which has been placed between the electrodes 26. Should the closure 82 be removed from the chamber 16, either by hand or from internal pressure within the chamber 16, the block 92 will disengage the leg portions 68 and the same will be spaced from the contact plates 52 to open circuit and thus prevent edibles or the like in the chamber 16 from boiling over and electrical shock by contact with the exposed electrodes 26.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention, what is claimed as new is:

1. An electrical kitchen appliance comprising a base, a baking chamber carried by said base including a closure, a housing, a plurality of contact units carried by said housing, means carried by said closure for actuating said contact units to complete a circuit when the closure is in its closed position, electrode plates mounted in said chamber and connected to said contact units, and means for removably securing said housing relative to said baking chamber, said switch being in a circuit open position when the closure is moved from its closed position, said last mentioned means includes a pair of straps carried by said housing, said straps having looped portions, and recesses provided in said chamber for yieldingly receiving said looped portions.

2. An electrical kitchen appliance comprising a base having legs for supporting the same in an elevated position, a baking chamber removably carried by said base, a removable closure frictionally carried by said chamber having pressure outlet openings, electrode plates carried by said chamber, a housing, electrical contact units carried by said housing, means removably securing said housing to said baking chamber, and means carried by said closure for actuating said contact units to pass electric current through a dough mass in said chamber, said contact units being deactuated upon removal of the closure from the baking chamber.

3. An electrical kitchen appliance comprising a base having an upstanding central portion and supporting legs, a baking chamber open at its upper and lower end, the lower end of said baking chamber frictionally engaging the upstanding central portion of said base, a removable closure carried by the upper end of said baking chamber having a plurality of pressure relief openings, a housing removably carried by said baking chamber, a plurality of electrical contact units operatively connected to a source of current, switch means carried by said contact units, means carried by said closure for actuating said switch means to a circuit closing position when the closure is in its closed position, and opposed electrode plates mounted in said chamber and connected to said contact units, said switch means being in circuit open position upon removal of the closure from the chamber.

4. The combination of claim 3 wherein said switch means includes a fixed contact plate and a movable contact plate normally spaced relative to said fixed contact plate.

5. An electrical kitchen appliance comprising a base having an upstanding central portion and supporting legs, a baking chamber open at its upper and lower ends, the lower end of said baking chamber frictionally engaging the upstanding central portion of said base, a removable closure carried by the upper end of said baking chamber having a plurality of pressure relief openings, a housing removably carried by said baking chamber, a plurality of electrical contact units operatively connected to a source of current, switch means carried by said contact units, means carried by said closure for actuating said switch means to a circuit closing position when the closure is in its closed position, and opposed electrode plates mounted in said chamber and connected to said contact units, said switch means being in circuit open position upon removal of the closure from the chamber, said switch means including a fixed contact plate and a movable contact plate normally spaced relative to said fixed contact plate, and said means carried by said closure for actuating said switch means includes a wedge block frictionaly engaging and forcing said movable contact plate into engagement with said fixed contact plate.

6. An electrical kitchen appliance comprising a base having an upstanding central portion and supporting legs, a baking chamber open at its upper and lower end, the lower end of said baking chamber frictionally engaging the upstanding central portion of said base, a removable closure carried by the upper end of said baking chamber having a plurality of pressure relief openings, a housing, means removably securing said housing relative to said baking chamber, a plurality of electrical contact units operatively connected to a source of current, means for directing current through said baking chamber, switch means carried by said contact units, and means carried by said closure for actuating said switch means to a circuit closing position as the closure is moved to its closed position, said switch means being in circuit open position as the closure is moved from its closed position relative to the chamber.

7. The combination of claim 6 wherein said current directing means includes a plurality of electrode plates removably positioned in said baking chamber.

8. An electrical kitchen appliance comprising a base having an upstanding central portion and supporting legs, a baking chamber open at its upper and lower ends, the lower end of said baking chamber frictionally engaging the upstanding central portion of said base, a removable closure carried by the upper end of said baking chamber having a plurality of pressure relief openings, a housing, means removably securing said housing relative to said baking chamber, a plurality of electrical contact units operatively connected to a source of current, means for directing current through said baking chamber, switch means carried by said contact units, and means carried by said closure for actuating said switch means to a circuit closing position as the closure is moved to its closed position, said switch means being in circuit open position as the closure is moved from its closed position relative to the chamber, said means for removably securing said housing to said baking chamber including a plurality of resilient arms having looped portions, said baking chamber being provided with recesses for receiving said looped portions.

STEPHEN C. MAJOR.

REFERENCES CITED

The following references are of record in the file of this patent:

UNITED STATES PATENTS

| Number | Name | Date |
|---|---|---|
| 996,454 | Carpenter | June 27, 1911 |
| 1,426,169 | Frank, Jr. et al. | Aug. 15, 1922 |
| 1,954,305 | Williams | Apr. 10, 1934 |
| 2,054,756 | Kremer | Sept. 15, 1936 |
| 2,407,439 | Olson | Sept. 10, 1946 |

FOREIGN PATENTS

| Number | Country | Date |
|---|---|---|
| 757,656 | France | Dec. 30, 1933 |